United States Patent [19]

MacKinnon, Jr.

[11] Patent Number: 4,969,919
[45] Date of Patent: Nov. 13, 1990

[54] VEHICLE FUEL SYSTEM WITH FILL PREVENTION STRUCTURE

[75] Inventor: Donald T. MacKinnon, Jr., Birmingham, Mich.

[73] Assignee: General Motors Corporation, Detroit, Mich.

[21] Appl. No.: 516,659

[22] Filed: Apr. 30, 1990

[51] Int. Cl.⁵ .............................................. F02B 77/00
[52] U.S. Cl. ................................ 123/198 D; 137/587; 141/98
[58] Field of Search ................... 123/198 D, 514, 516, 123/518, 519; 137/587, 588; 141/59, 98

[56] References Cited

U.S. PATENT DOCUMENTS 4,706,708 11/1987 Fornuto et al. ........................ 141/59
4,903,672 2/1990 MacKinnon ........................ 123/520

FOREIGN PATENT DOCUMENTS 62-41957 2/1987 Japan ................................. 123/516

Primary Examiner—Noah P. Kamen
Attorney, Agent, or Firm—Patrick M. Griffin

[57] ABSTRACT

Return fuel from the engine is routed through the fuel tank vent pipe, blocking it and preventing fuel fill while the engine is running.

2 Claims, 2 Drawing Sheets

VEHICLE FUEL SYSTEM WITH FILL PREVENTION STRUCTURE

This invention relates to vehicle fuel systems in general, and specifically to a fuel system with a means to prevent the fuel tank from being filled while the engine is running.

BACKGROUND OF THE INVENTION

Vehicle filling stations generally warn motorists to turn off their vehicle engines before fuel systems have no means to prevent the tank from being filled while the engine is running.

SUMMARY OF THE INVENTION

The invention provides a means for preventing fuel fill while the engine is running that avoids the need for extra components or sensors by taking advantage of the fuel return.

In the preferred embodiment disclosed, the vehicle fuel system is the type in which unburned fuel is continually returned from the engine while the engine is running. The fuel tank is basically conventional, with a filler pipe having an upper end closed by a gas cap, and a lower end that feeds into the tank. The tank is filled by the type of fill nozzle that automatically shuts off if liquid fuel backs up in the filler pipe far enough to reach it. A vent pipe runs parallel to the filler pipe, from a lower end that opens into the fuel tank interior to an upper end that opens outside of the tank. The fuel return line from the engine, instead of opening directly into the tank, opens instead into the vent pipe intemediate its two ends. While the engine is running, the return fuel runs into and out through the vent pipe before it reaches the tank, blocking the vent pipe. Because the vent pipe is blocked, the tank cannot vent normally, and liquid fuel will back up the filler pipe and shut off the nozzle. When the engine is off, the tank can fill normally. Since most fuel systems already have a tank vent pipe, no extra components are needed.

It is, therefore, a general object of the invention to provide a fuel system that prevents the fuel tank from being filled while the engine is running.

It is another object of the invention to provide means for prevnting fill that takes advantage of the unburned fuel that is continually returned to the fuel tank while the engine is running, so as to avoid the need for any extra components.

It is another object of the invention to prevent fill by routing the returned fuel through the fuel tank vent pipe on its way back to the tank, thereby blocking the vent pipe only while the engine is running, so that fuel cannot be pumped in.

BRIEF DESCRIPTION OF THE FIGURES

These and other objects of the invention will appear from the following written description, and from the drawings, in which.

DESCRIPTION OF THE PREFERRED EMBODIMENT

Figure 1:
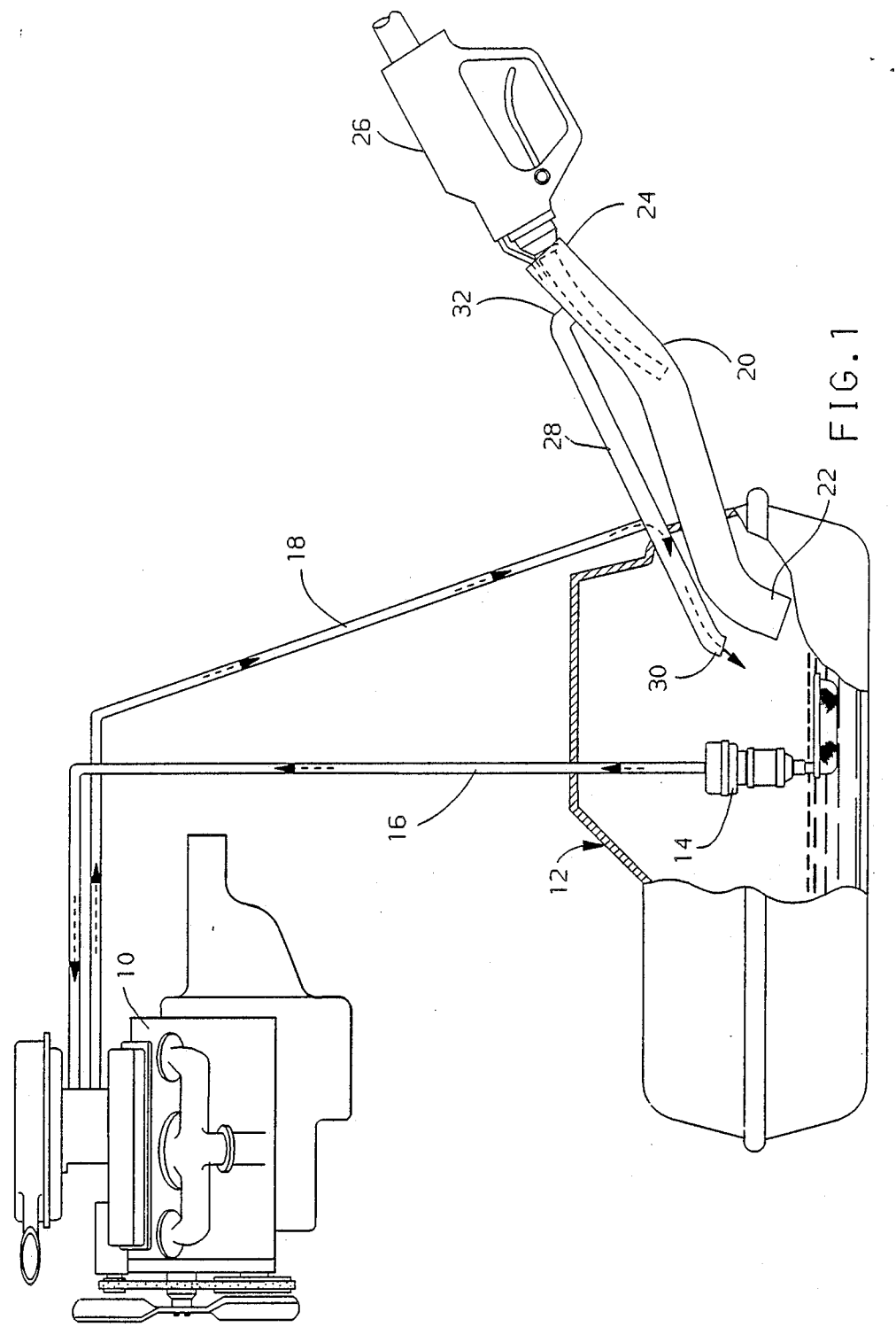
FIG. 1 is a view of a vehicle fuel system incorporating a preferred embodiment of the invention, with the engine running.

Referring first to FIG. 1, a vehicle includes a conventional engine 10 and fuel tank, indicated generally at 12. The fuel system is the type in which liquid fuel is sent from fuel tank 12 by a pump 14 through fuel line 16 to engine 10, with any unburned fuel returned through a return line 18. When engine 10 is isdling, the flow of unburned return fuel will be at a maximum. Tank 12 has a standard filler pipe 20 with a lower end 22 that feeds into tank 12 and an upper end 24. Filler pipe upper end 24 would be closed by a removable gas cap, not shown, and receives a standard fuel fill nozzle 26. Fill nozzel 26 is the type that shuts off automatically if liquid fuel backs up filler pipe 20, thereby avoiding spills. As such, fill nozzle 26 can pump fuel through filler pipe 20 and into fuel tank 12, as shown by the arrows, only if the air and fuel vapor displaced from tank 12 by the entering liquid fuel has easy egress from tank 12.

Figure 2:
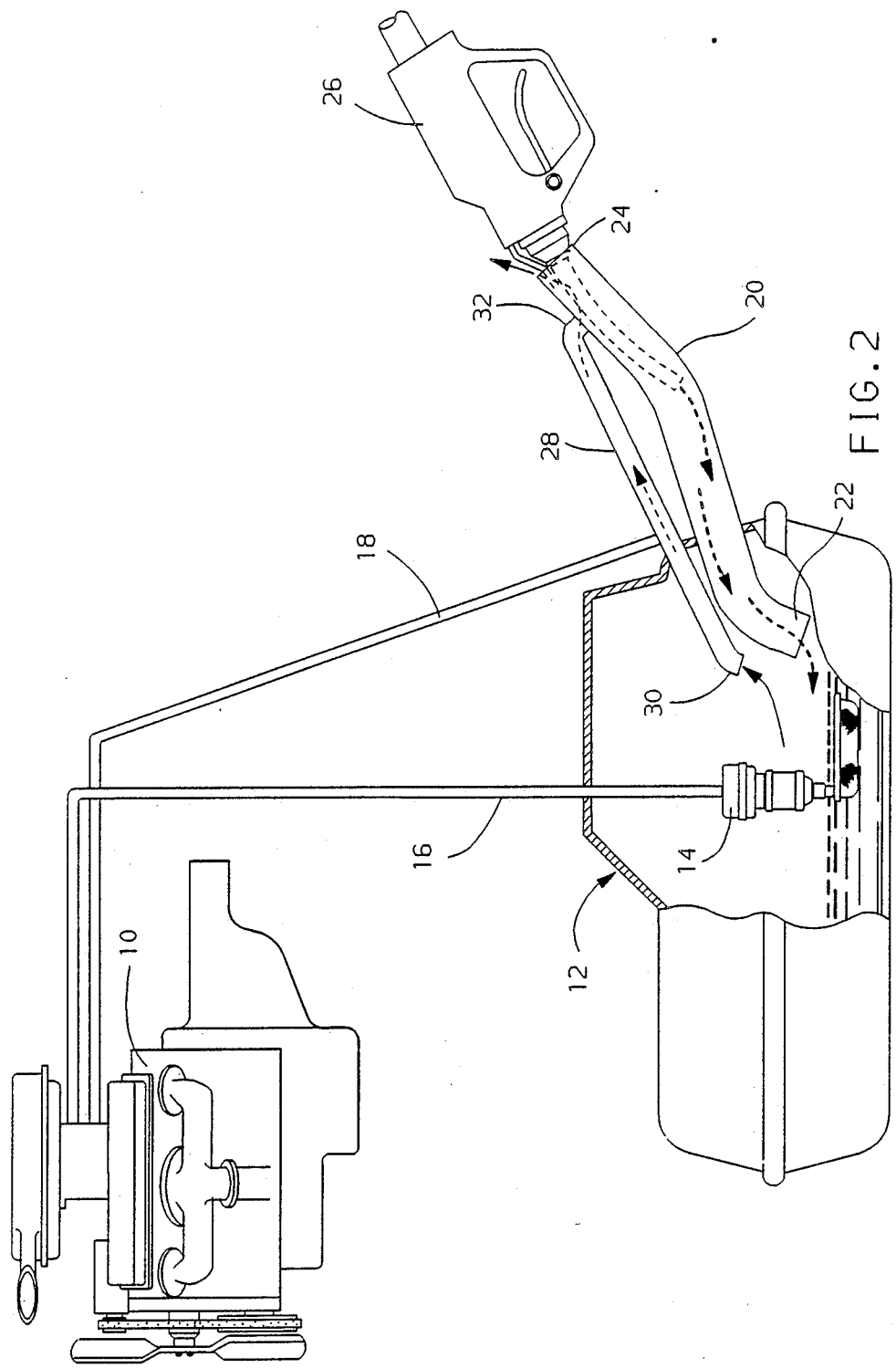
FIG. 2 is a view like FIG. 1, but with the engine off.

Referring to FIG. 2, tank venting is provided by a tank vent pipe 28, which runs parallel to filler pipe 20. Vent pipe 28 has a lower end 30 that opens into the interior of tank 12, above the filler pipe lower end 22. The vent pipe upper end 32 opens into filler pipe upper end 24, below the cap and above the point where fuel would leave nozzle 26. As shown by the arrows, any air and vapor displaced can pass through vent pipe 28 and out filler pipe upper end 24, which is not totally blocked by nozzle 26. Once liquid fuel reaches vent pipe lower end 30, vent pipe 28 is blocked, venting stops, and liquid fuel will back up in filler pipe 20 to nozzle 26 to shut it off. Should liquid fuel back up vent pipe 28 for any reason, it can also reach nozzle 26 through upper end 32 to shut it off. Although engine 10 is off, as shown in FIG. 1, there is nothing in a conventional fuel system to prevent the venting process shown from taking place while engine 10 is running.

Referring next to FIG. 1, it may be seen how the invention prevents fuel fill while engine 10 is running. Fuel is pumped to engine 10 by pump 14, through fuel line 16, and back through return line 18, as shown by the arrows. Fuel return line 18, instead of opening through the top of fuel tank 12, as is conventional, opens into vent pipe 28, intermediate its two ends 30 and 32. From there, it runs down and out vent pipe lower end 30. This continual flow of return fuel keeps vent pipe lower end 30 blocked, just as if liquid fuel had risen high enough to block it during normal fill. Since tank 12 cannot vent, liquid fuel would back up filler pipe 20 and nozzle 26 would shut off. The natural slope of vent pipe 28 is great enough that return fuel should not back up to its upper end 32. Even if that did occur, nozzle 26 would still be shut off. Therefore, fuel fill is prevented while the engine 10 is running, with no extra components. The return fuel is rerouted so as to effectively fool the system into thinking that tank 12 has already been filled.

The preferred embodiment is easily incorporated into a tank venting system that uses a basically conventional vent pipe 28, as disclosed. Future fuel system designs may choose to vent the displaced tank vapors to a vapor recovery system, rather than to atmosphere. Such a fuel tank vent would still have an inner opening in the interior of the tank, and an outer opening somewhere outside of the tank vent between its two openings, the vent will be blocked while the engine is running, preventing tank venting and preventing fuel fill. Therefore, it will be understood that the invention is capable of embodiments other than that disclosed, and is not intended to be so limited.

The embodiments of the invention in which an exclusive property or privilege is claimed are defined as follows:

1. In a vehicle having a fuel system of type in which unburned fuel is continually returned from the vehicle engine while running, a means to prevent said fuel tank from being filled from a standard filler nozzle while said engine is running, comprising, a filler pipe having a lower end that feeds into said fuel tank and an upper end adapted to receive said filler nozzle when said fuel tank is being filled, a fuel tank vent having an inner opening inside said fuel tank and an outer opening outside of said fuel tank to allow said fuel tank to vent as liquid fuel enters through said filler pipe, and, a fuel return line from said engine opening into said vent pipe between its inner and outer openings, whereby, when said engine is running, unburned fuel returning from said engine blocks said fuel tank vent inner opening to prevent said fuel tank from venting, thereby preventing liquid fuel from entering said fuel tank through said filler pipe.

2. In a vehicle having a fuel system of type in which unburned fuel is continually returned from the vehicle engine while running, a means to prevent said fuel tank from being filled from a standard filler nozzle while said engine is running, comprising, a filler pipe having a lower end that feeds into said fuel tank and an upper end adapted to receive said filler nozzle when said fuel tank is being filled, a vent pipe having a lower end that opens into said fuel tank and an upper end that opens outside of said fuel tank to allow said fuel tank to vent as liquid fuel enters through said filler pipe, and, a fuel return line from said engine opening into said vent pipe between its upper and lower end, whereby, when said engine is running, unburned fuel returned from said engine runs continually through said vent pipe and out said vent pipe lower end, thereby blocking said vent pipe and preventing said fuel tank from venting and preventing liquid fuel from

* * * * *